(12) United States Patent
Bramhavar et al.

(10) Patent No.: US 10,571,483 B2
(45) Date of Patent: *Feb. 25, 2020

(54) INTEGRATED RESONANT ACCELEROMETER USING OPTICAL STRAIN SENSOR

(71) Applicant: Massachusetts Institute of Technology, Cambridge, MA (US)

(72) Inventors: Suraj Deepak Bramhavar, Cambridge, MA (US); Paul William Juodawlkis, Arlington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 107 days.

This patent is subject to a terminal disclaimer.

(21) Appl. No.: 15/807,531

(22) Filed: Nov. 8, 2017

(65) Prior Publication Data
US 2018/0128850 A1    May 10, 2018

Related U.S. Application Data

(60) Provisional application No. 62/419,524, filed on Nov. 9, 2016.

(51) Int. Cl.
*G01P 15/093* (2006.01)
*G01P 15/03* (2006.01)
*G01P 15/097* (2006.01)
*G01P 21/00* (2006.01)

(52) U.S. Cl.
CPC .......... *G01P 15/093* (2013.01); *G01P 15/032* (2013.01); *G01P 15/097* (2013.01); *G01P 21/00* (2013.01)

(58) Field of Classification Search
CPC ..... G01P 15/093; G01P 15/097; G01P 15/032
See application file for complete search history.

(56) References Cited

U.S. PATENT DOCUMENTS

| 4,900,918 A * | 2/1990 | Killian | G01D 5/243 |
| | | | 250/227.19 |
| 8,923,352 B2 * | 12/2014 | Strandjord | G01C 19/727 |
| | | | 356/213 |
| 9,927,458 B2 * | 3/2018 | Bramhavar | G01P 15/097 |
| 2011/0051144 A1 * | 3/2011 | Wilfinger | G01C 19/721 |
| | | | 356/459 |

(Continued)

*Primary Examiner* — Helen C Kwok
(74) *Attorney, Agent, or Firm* — Hamilton, Brook, Smith & Reynolds, P.C.

(57) ABSTRACT

An accelerometer may comprise a proof mass, a first tether mechanically coupled to the side of the proof mass and to an anchor, and a ring resonator integrated with the tether to form a sensing tether. The ring resonator and the tether may be configured such that a strain sustained by the sensing tether causes a change of a resonance condition of the ring resonator. The accelerometer may comprise a wavelength locking loop configured to adaptively maintain a center frequency of the light energy at a resonant frequency of the sensing element, and a scale factor calibrator configured to stabilize a scale factor associated with the accelerometer. The accelerometer may further include a detection processor configured to receive the detection signal and produce an acceleration signal therefrom. The acceleration signal may correspond to an amount of change of the resonance condition with respect to a reference resonance condition.

19 Claims, 11 Drawing Sheets

(56) References Cited

U.S. PATENT DOCUMENTS

2014/0260614 A1* 9/2014 Bhave ................ G01C 19/5677
                                                        73/514.26
2016/0223329 A1* 8/2016 Zandi ................. G01C 19/5755
2016/0266331 A1* 9/2016 Hutchison .......... G02B 6/12016
2016/0349283 A1  12/2016 Bramhavar et al.
2018/0038890 A1* 2/2018 Dahlem ................ G01P 15/093

* cited by examiner

FIG. 1

(Prior art)

INTEGRATED RESONANT ACCELEROMETER USING OPTICAL STRAIN SENSOR

RELATED APPLICATIONS

This application claims the benefit of U.S. Provisional Application No. 62/419,524, filed on Nov. 9, 2016, and is related to U.S. application Ser. No. 15/166,599, filed on May 27, 2016. The entire teachings of the above applications are incorporated herein by reference.

GOVERNMENT SUPPORT

This invention was made with government support under FA8721-05-C-0002 from U.S. Air Force. The government has certain rights in the invention.

BACKGROUND

An accelerometer is a very common measurement device found in a multitude of systems. In the automotive industry, for instance, acceleration sensing is commonly used for airbag deployment. The computer industry utilizes accelerometers to protect hard disks from large shocks, and the aerospace industry employs inertial measurement units comprising multiple accelerometers and gyroscopes for sensing and navigation. Accelerometers are currently found in many personal handheld devices as well, where they are used to detect the general orientation of the device. In many high volume applications, the majority of accelerometer devices are made using microelectromechanical systems (MEMS) fabrication technologies.

These techniques allow for the devices to be batch fabricated in a CMOS process flow, enabling dramatic reductions in size, weight, power, and cost (SWaP-C) while maintaining adequate performance for a variety of applications. Examples of such techniques may be found in [1] Seshia, et al., "A Vacuum Packaged Surface Micromachined Resonant Accelerometer,", JMEMS, Sys., Vol. 11, No. 6, (2002), [2] R. Hopkins, et al., "The silicon oscillating accelerometer: a high-performance MEMS accelerometer for precision navigation and strategic guidance applications," ION NTM 2005, San Diego, Calif., pp. 970-979, (2005) and [3] A. Trusov, et al., "Silicon Accelerometer With Differential Frequency Modulation And Continuous Self-Calibration," 2013 IEEE MEMS Conf., Taipei, Taiwan, pp. 29-32, (2013).

Figure 1:
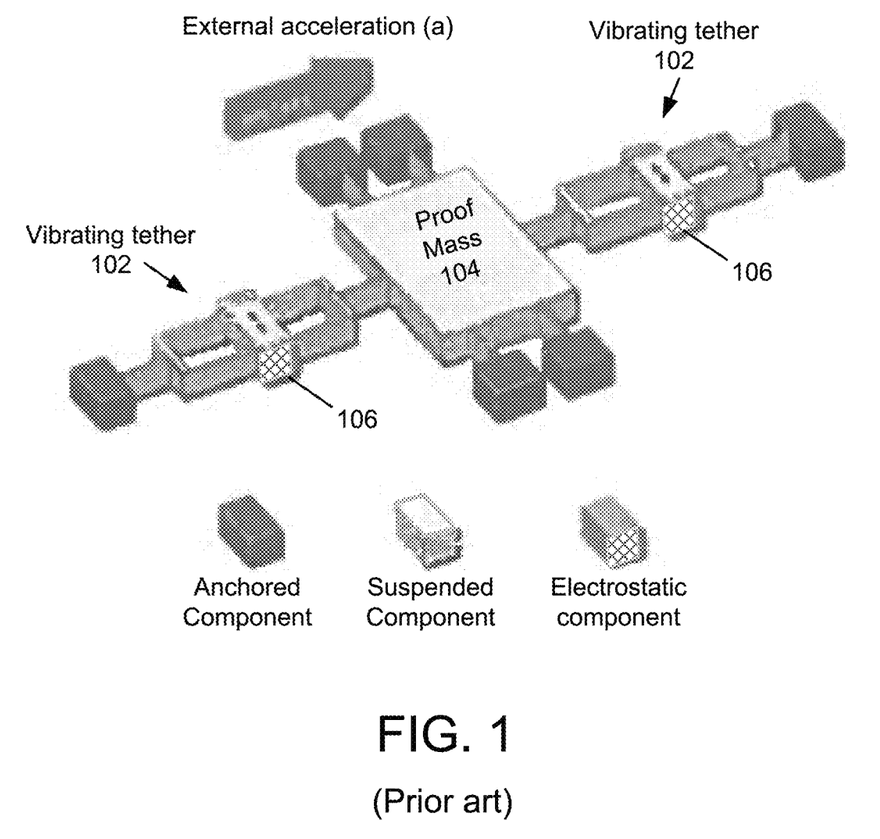
FIG. 1 shows an example of such a MEMS-based accelerometer.

FIG. 1 shows an example of such a MEMS-based accelerometer. The resonant frequencies of two vibrating sensing tethers 102 are detected and used to calculate the acceleration experienced by a large proof-mass 104, onto which the tethers are attached. In standard resonant MEMS accelerometers, the two vibrating sensing tethers 102 are excited and detected using electro-static comb drives 106. These comb drives 106 can be used to both excite motion in the tether 102, typically at its natural mechanical resonant frequency, as well as to detect this induced motion.

The purpose of the comb-drive detection is to precisely measure the resonant frequency of the tethers, acting as a small strain gauge. The tethers are attached to the large proof mass 104, which experiences displacement as a result of applied acceleration. This proof mass displacement pulls one of the tethers 102 into tension while pushing the other tether 102 into compression, altering the resonant frequencies of the tethers 102 as a result. The resonant frequency shifts have equal magnitudes, but opposite sign, only if the proof mass acceleration occurs in the desired axis. Any acceleration, and resulting displacement, experienced in orthogonal dimensions, forces the tether resonant frequencies to shift together, which allows for a differential measurement and a cancellation of unwanted signals.

For inertial navigation applications, however, there is a general desire to improve upon the sensitivity of accelerometers, while simultaneously improving the stability of the measured signals over long time periods.

The parameter associated with resonant accelerometer sensitivity is the scale factor, which is the amount of frequency shift experienced by an individual tether as a result of a given acceleration of the proof mass attached thereto. The scale factor may be expressed in units of Hz/g. A larger scale factor is generally desirable, not only to increase system sensitivity, but also to reduce the impact of unwanted drifts in the sensor signal due to temperature and other fluctuations in the surrounding environment over time. For example, in the case where the scale factor is equal to 10 Hz/g and the tether resonant frequency is stable to within 1 Hz over long periods of time, the measured signal, in units of measured acceleration, will drift by 0.1 g over this time. If instead the scale factor is increased to 10 kHz/g (a factor of 1000) and the tether frequency stability stays exactly the same, the measured signal will now drift by only 0.1 mg (a factor of 1/1000). This scale factor is dependent on the ratio of the size of the proof mass to the size of the tether, where larger proof masses and smaller tethers result in larger scale factors.

Since acceleration measurements need to be integrated twice to retrieve position, measurement errors and/or noise in the original signal can produce significant errors in final assumed position. Consequently, there is a large effort to improve performance of these devices to reduce this measurement error. To date, accelerometers with improved performance typically come at the expense of size and power, moving away from MEMS fabrication technologies to take advantage of a larger proof-mass in order to achieve higher sensitivity and long term stability. There is a need to break this trade-off and develop accelerometers with excellent sensitivity and long-term stability, while maintaining the low SWaP-C of MEMS devices.

SUMMARY

A photonic accelerometer is described which combines the desirable attributes of microelectromechanical systems (MEMS) accelerometers with a photonic integrated circuit (PIC) technology. The embodiments herein describe a sensing element formed on a proof mass tether, which facilitates direct sensing of strain in the tether due to acceleration experienced by the proof mass. The embodiments further describe a wavelength locking loop to facilitate a stable resonance bias, and a scale factor calibrator to stabilize the scale factor associated with the photonic accelerometer, either or both of which may be associated with the sensing element.

In one aspect, the invention is an accelerometer, comprising a proof mass, and a first tether, mechanically coupled to a first side of the proof mass and mechanically coupled to a first anchor site. A first photonic ring resonator is formed on the first tether to form a first sensing tether, such that the first photonic ring resonator undergoes strain along with the first tether. The first photonic ring resonator and the first tether are configured such that a strain sustained by the first sensing tether causes a change of a first resonance condition of the first photonic ring resonator.

An embodiment further comprises an excitation and detection system, operably coupled to the first photonic ring resonator, to sense the resonance condition of the first photonic ring resonator and to produce a first detection signal corresponding to the resonance condition of the first photonic ring resonator. The excitation and detection system may comprise at least a laser, a first waveguide configured to convey light energy from the laser to the photonic ring resonator, a photodiode, and a second waveguide configured to convey light energy from photonic ring resonator to the photodiode. The excitation and detection system may further comprise a wavelength locking loop configured to adaptively maintain a center frequency of the light energy substantially at a resonant frequency of the first photonic ring resonator. The wavelength locking loop may be a Pound-Drever-Hall feedback loop. The excitation and detection system may further comprise a scale factor calibrator configured to stabilize a scale factor associated with the accelerometer. The accelerometer may further comprise a detection processor configured to receive the detection signal and produce an acceleration signal therefrom, the acceleration signal corresponding to an amount of change of the resonance condition with respect to a reference resonance condition.

The excitation and detection system may be integrated on a monolithic platform along with the proof mass and the sensing tether. The cross-sectional dimensions, W×L, of the sensing tether may be at least one of W<5μ and L<5μ. The proof mass may comprise a full thickness of a bulk silicon wafer upon which the accelerometer is fabricated. The first tether may comprise silicon dioxide.

The accelerometer may further comprise a second tether, mechanically coupled to a second side of the proof mass and mechanically coupled to a second anchor site. The second side may be an opposing side of the proof mass with respect to the first side. A second photonic ring resonator may be formed on the second tether to form a second sensing tether. The second photonic ring resonator and the second tether may be configured such that a strain sustained by the second sensing tether causes a change of a resonance condition of the second photonic ring resonator. The excitation and detection system may be further operably coupled to the second photonic ring resonator, configured to convey light energy from the laser to the second photonic ring resonator, to sense the resonance condition of the second photonic ring resonator, and to produce a second detection signal corresponding to the resonance condition of the second photonic ring resonator. The accelerometer may further comprise a detection processor configured to receive the first detection signal and the second detection signal, and produce an acceleration signal therefrom. The acceleration signal may correspond to an amount of change of the resonance condition of the first photonic ring resonator and an amount of change of the resonance condition of the second photonic ring resonator, with respect to a reference resonance condition. The detection processor may be further configured to cancel an effect of thermal drift as a function of opposing detection signals produced by the first photonic ring resonator and the second photonic ring resonator.

In another aspect, the invention is a method of fabricating an accelerometer, comprising defining at least one of a photonic waveguide and a photonic ring resonator on a silicon-on-insulator (SOI) substrate. The SOI substrate may have an insulator layer and a silicon layer. The method may further comprise integrating one or more active components on the SOI substrate, defining at least one sensing tether by etching partially through the insulator layer of the SOI substrate, defining a proof mass by etching through the silicon layer of the SOI substrate, and releasing the at least one sensing tether by selectively etching the insulating layer of the SOI substrate.

In an embodiment, the one or more active components may comprise at least one of (i) a photodiode, (ii) a laser, (iii) a phase tuner, and (iv) a photonic ring resonator. The one or more active components may further comprise at least one of a scale factor calibrator and a wavelength locking loop.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

The teachings of all patents, published applications and references cited herein are incorporated by reference in their entirety.

The described embodiments are directed to a photonic accelerometer which combines the desirable attributes of microelectromechanical systems (MEMS) accelerometers with a photonic integrated circuit (PIC) technology and components. The described embodiments further comprise a sensing element integrated with a proof mass tether, which facilitates direct sensing of strain in the tether due to acceleration experienced by the proof mass. Related application US 2016/0349283 (the '238 application) describes a resonator separated from a vibrating proof mass tether, and evanescent coupling between the resonator and tether to sense vibration of the tether. By contrast, the embodiments described herein include a resonator formed on (e.g., embedded in) the tether itself. Accordingly, in the described embodiments, the resonator itself experiences mechanical strain due to proof mass acceleration directly, along with the tether, and resonant frequency of the resonator varies as a direct result of resonator strain.

As set forth herein, higher sensitivity is a desirable attribute of an accelerometer, which corresponds to a large scale factor. For the previously-described resonant or FM accelerometers as shown in FIG. 1, the size of the sensing tethers is typically limited by the electro-static comb drives required to both excite and detect their motion. The amount of tether size reduction is limited due to practical considerations. For example, smaller tethers suffer from reduced detection sensitivity, which is dependent on the surface area of the electro-static comb drive. The reduced sensitivity, combined with smaller displacement amplitudes, makes it very difficult to detect acceleration of an associated proof mass using tethers with cross-sectional dimensions of less than 10 microns (10μ). This limits the achievable scale factor in conventional MEMS-based resonant accelerometers.

The optical transduction techniques of the described embodiments may dramatically increase the scale factor, relative to devices described with respect to FIG. 1, as they have demonstrated the capability of accurately measuring strain in very small mechanical structures. These techniques have also been demonstrated on integrated chip-scale platforms, where the requisite optoelectronic devices (e.g., lasers, detectors, etc.) can be integrated on the same monolithic platform.

The device of the described embodiments may comprise a standard resonant accelerometer where strain in the sensing tethers is detected using a photonic integrated circuit instead of electro-static comb drives. The sensing tethers may have cross sectional dimensions of approximately 1 μm, allowing for scale factors that are over 20 dB greater than existing MEMS devices. In an example embodiment of the device, a silicon proof mass may be defined with a 4 μm×70 μm tether attached to one side and another 4 μm×70 μm tether attached to the opposite side. The silicon proof mass may be the full thickness of the bulk silicon wafer, allowing for a higher total mass and thus higher sensitivity. The small tethers may be made of silicon dioxide, with 200 nm thick silicon photonic waveguides buried within the silicon dioxide tether.

Displacement of the mass in the sensing direction will result in equal and opposite strain applied to the two tethers, and this strain is measured by monitoring the resonance frequency of optical resonators fabricated within each sensing tether. Any change in tether strain results in a change in its refractive index due to the photoelastic effect, and translates directly to a shift in the tether resonance frequency. When probed at the appropriate incident optical wavelength, this shift corresponds to a change in the transmitted optical power measured with a photodiode. Measuring the opposing resonance shifts in each tether allows for acceleration in the desired direction to be decoupled from temperature variations, which affect both tethers substantially the same. Temperature variations typically dominate long-term drifts in accelerometers. The opposing signals from the two tethers cancel out errors due to thermal drift. Acceleration signals derived from the different tethers are of opposing sign, since the tethers are on opposite sides of the proof mass.

Figure 2A:
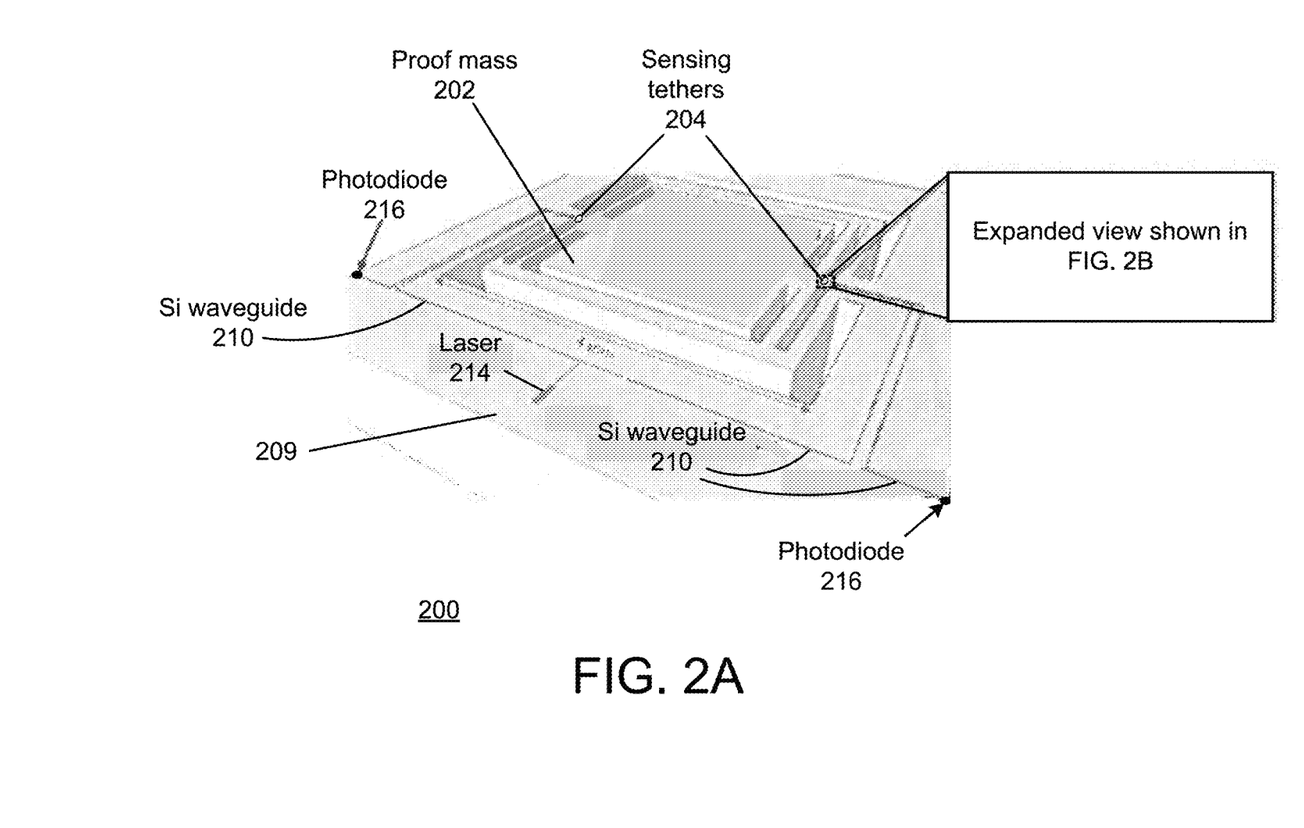
FIG. 2A illustrates an example embodiment of a photonic accelerometer according to the invention.
Figure 2B:
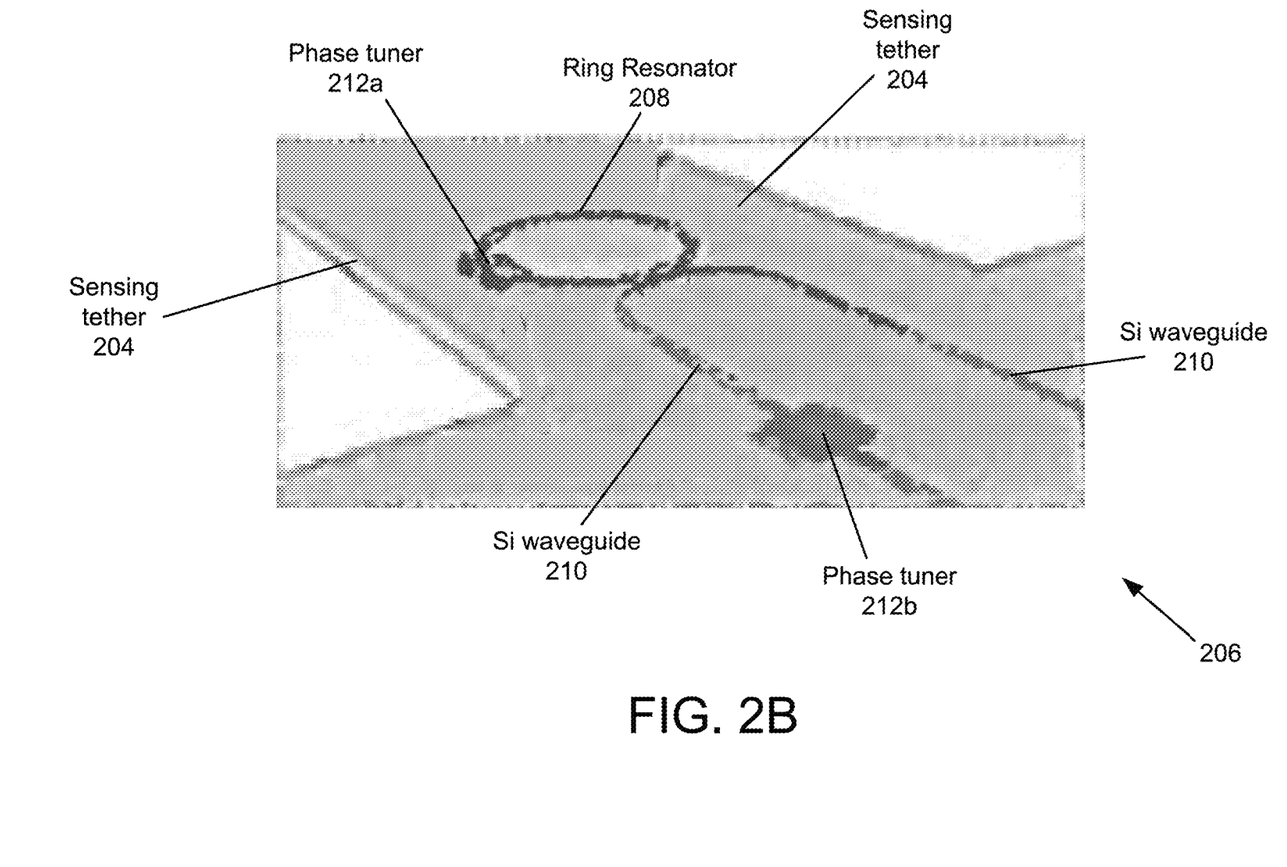
FIG. 2B shows an expanded view of the sensing tether of the photonic accelerometer shown in FIG. 2A.
Figure 2C:
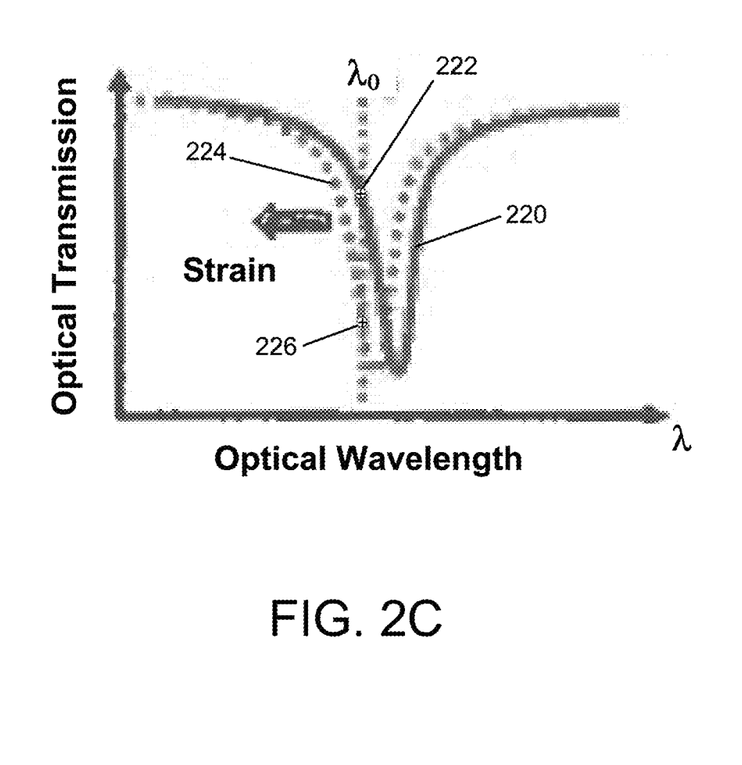
FIG. 2C is a graph plotting the magnitude of the optical energy transmitted through the waveguides and ring resonator as a function of the wavelength of the optical energy.
Figure 2D:
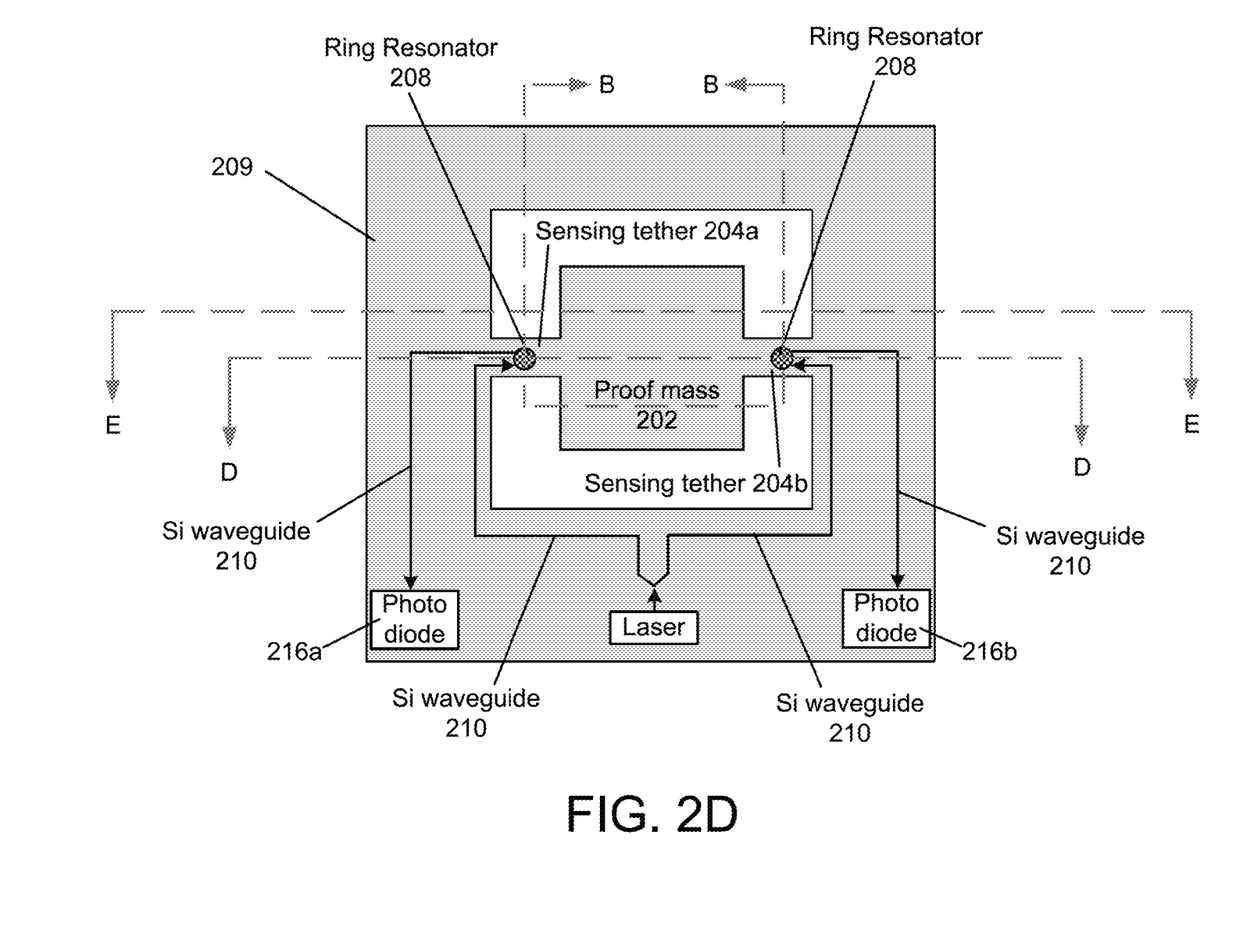
FIG. 2D shows a simplified view of the photonic accelerometer 200 of FIG. 2A.

FIG. 2A illustrates an example embodiment of a photonic accelerometer 200 according to the invention. FIG. 2B shows an expanded view of the sensing tether 204 of the photonic accelerometer 200 shown in FIG. 2A. FIG. 2C is a graph plotting the magnitude of the optical (light) energy transmitted through the waveguides 210 and photonic ring resonator 208 as a function of the wavelength of the optical energy. FIG. 2D shows a simplified view of the photonic accelerometer 200 of FIG. 2A.

The photonic accelerometer 200 of this example embodiment includes a proof mass 202, and a pair of sensing tethers 204 coupled to the proof mass 202 at opposite sides of the proof mass 202. The proof mass 202 depicted in the example embodiments of FIGS. 2A and 2D are rectangular, but in alternative embodiments the proof mass 202 may be square, round, elliptical, polygonal, other shapes suitable to the particular form factor required by the application using the photonic accelerometer 200.

As shown in the exploded view of FIG. 2B, a photonic ring resonator 208 is formed on (e.g., embedded in) the tether element that connects the proof mass 202 to the main body 209 of the photonic accelerometer 200, so as to form a combined, integrated unit, referred to herein as the sensing tether 204. The silicon waveguides 210 convey light energy to and from the photonic ring resonator 208 by evanescent coupling. As used herein, the term light energy refers to electromagnetic energy having a wavelength that falls within the propagation bandwidth of the silicon waveguides 210. In operation, a light beam at a wavelength close to the resonant wavelength of the ring resonator 208 can be transmitted through the waveguide 210. At least a portion of the light beam is coupled into the ring resonator 208 due to the evanescent coupling between the waveguide 210 and the ring resonator 208

One or more phase tuners 212a, 212b, may be used to adjust the phase of the light energy conveyed by the silicon waveguides 210 and propagating through the ring resonator. A laser 214 generates light energy and directs the light energy to the ring resonator 208 by way of the silicon waveguides 210. A photodiode 216 receives light energy, through the silicon waveguides 210, after the light passes the ring resonator 208. The laser and the waveguides 210 that convey light energy to the ring resonator 208, together with the photodiode 216 and the waveguides 210 that convey light energy from the ring resonator 208, are referred to herein as the excitation and detection system.

The graph in FIG. 2C shows optical transmission of the light energy, from the laser to the photodiode, as a function of optical wavelength. The graph demonstrates that the ring resonator 208 causes a notch (i.e., an abrupt drop in amplitude) at a particular frequency. This notch occurs at the resonant frequency of the ring resonator 208. The solid trace 220 demonstrates the notch as it occurs when the resonator 208 is not experiencing strain. Light energy at $\lambda_0$ intersects the solid trace 200 at point 222. As the sensing tether 204 (i.e., the integrated tether element and ring resonator 208) experiences strain due to acceleration of the proof mass, the notch frequency shifts, as shown by dotted trace 224. The shift is due to a change in the refractive index experienced by the light energy as the light energy passes through the ring resonator 208. Because the ring resonator 208 is integrated with the tether element, its refractive index changes directly with respect to the strain experienced by the sensing tether 204, rather than through an indirect coupling between the tether element and the ring resonator (e.g., evanescent coupling). Light energy intersects the dotted trace 224 at point 226, at a lower optical transmission value than point 222. Thus, as the sensing tether undergoes strain, the optical transmission output changes (in this example, drops). The optical transmission output may therefore be used to detect strain in the sensing tether.

The amount of the shift of the notch frequency may be used to determine strain experienced by the sensing tether, and thus the acceleration of the proof mass. The photodiodes 216 produce a signal corresponding to the optical transmission of the light energy. A detection processor (not shown in FIGS. 2A-2D) may receive and evaluate the signals from the photodiodes 216 to produce an acceleration signal that conveys a value corresponding to the acceleration experienced by the proof mass 202.

An example process flow for fabricating a photonic accelerometer according to the described embodiments is shown in FIGS. 3A through 3D. It should be understood that, for brevity, this example process flow describes only several major steps in the overall process flow, and that other steps may be required to complete the fabrication process.

Figure 3A:
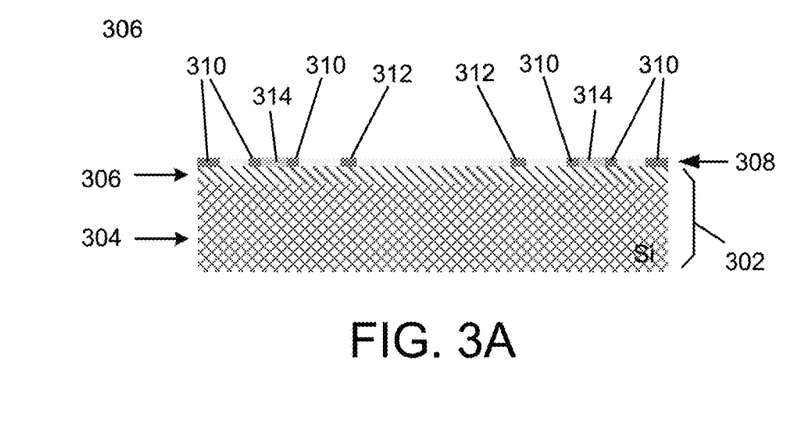
FIGS. 3A through 3E show an example process flow for fabricating a photonic accelerometer according to the described embodiments.

Referring to FIG. 3A, an example photonic accelerometer may be fabricated beginning with a silicon-on-insulator (SOI) wafer substrate 302, comprising a bulk silicon (Si) layer 304 and a silicon dioxide ($SiO_2$) insulator layer 306. A thin silicon epitaxial layer 308 is grown in the $SiO_2$ layer 306. The photonic waveguides 310 and the ring resonator 312 are etched into the epitaxial layer 308. Active components 314, such as the photodiode and the phase tuner, may also be integrated in the epitaxial layer 308 using standard fabrication techniques known in the art. It should be understood that the components implemented into the epitaxial layer 308 are shown generally, as descriptive examples, and that placement within FIGS. 3A-3D are not necessarily shown to scale or situationally correct.

Figure 3B:
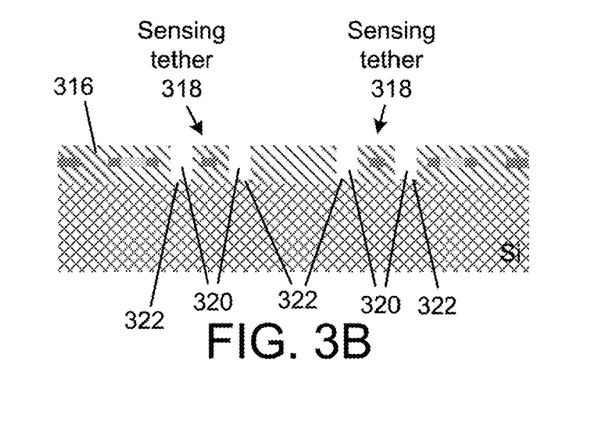
Figure 3C:
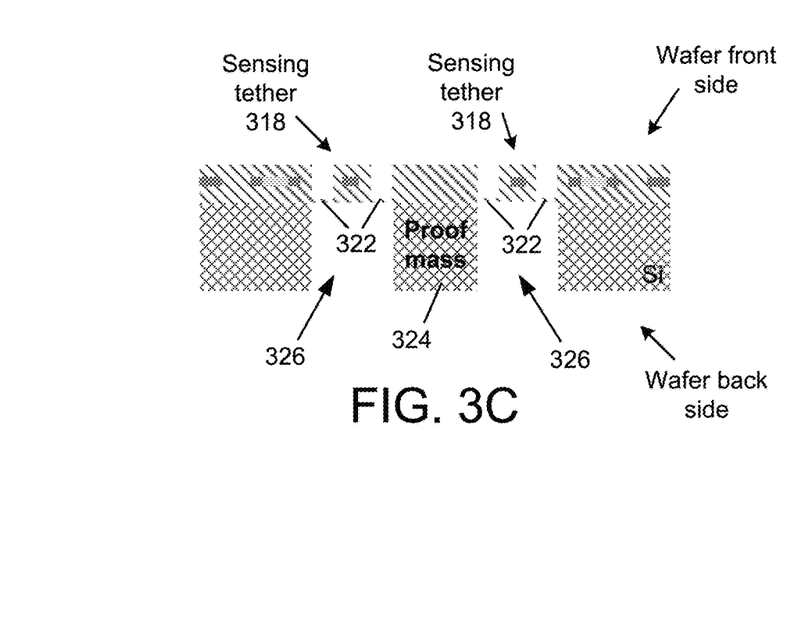

Referring to FIG. 3B, the epitaxial layer 308 may be covered with a second $SiO_2$ layer 316. One or more sensing tethers 318 may be defined by etching 320 through second layer of $SiO_2$ and the 2 μm (in the example embodiment) of buried silicon dioxide 306 until nearly reaching the silicon substrate 316, leaving only a thin strip 322 of $SiO_2$. FIGS. 3B and 3C are taken along a cross-section line B-B, in FIG. 2D, having right angles to show cross sections through the tether and the proof mass.

Figure 3D:
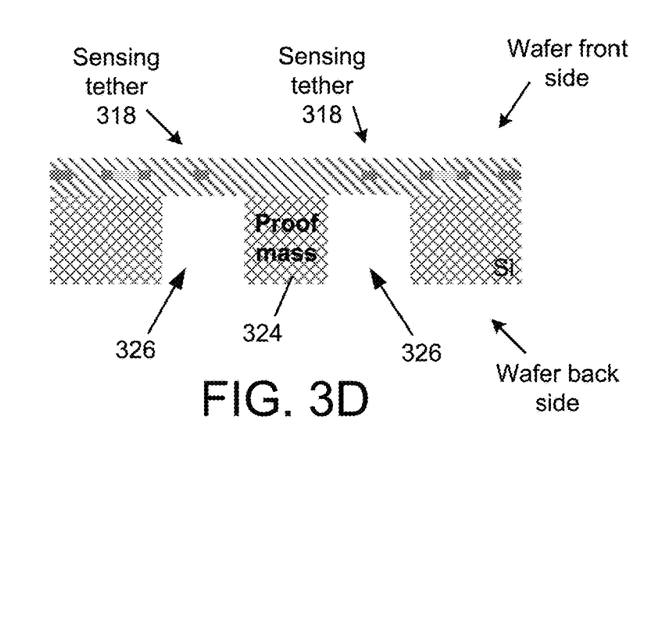
Figure 3E:
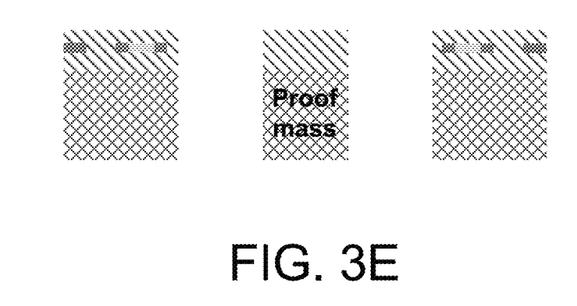

Referring to FIG. 3C, the large proof mass 324 can then be defined by etching fully through 326 the 700 μm thick (in the example embodiment) silicon substrate 304 from the back side, using a deep reactive ion etch (DRIE). DRIE is a common tool used in MEMS fabrication techniques. Finally, the proof mass 324 can be released by using a timed hydrofluoric acid (HF) etch 320 to remove the small amount of silicon dioxide 322 left on the front side of the wafer substrate 302. FIG. 3D is taken along a line D-D of FIG. 2D to show the proof mass suspended by the sensing tether. FIG. 3E is taken along line E-E of FIG. 2D to show only the proof mass and not the supporting tethers.

Beyond the sensitivity of the device, two important metrics in accelerometer performance include the long term stability in scale factor (i.e., system sensitivity) and bias (i.e., measured signal with no inertial input). In order to maintain very good long term bias stability, a wavelength locking control circuit is implemented to maintain the incident optical wavelength at a particular value with respect to the optical resonance of the sensing tether.

Figure 4:
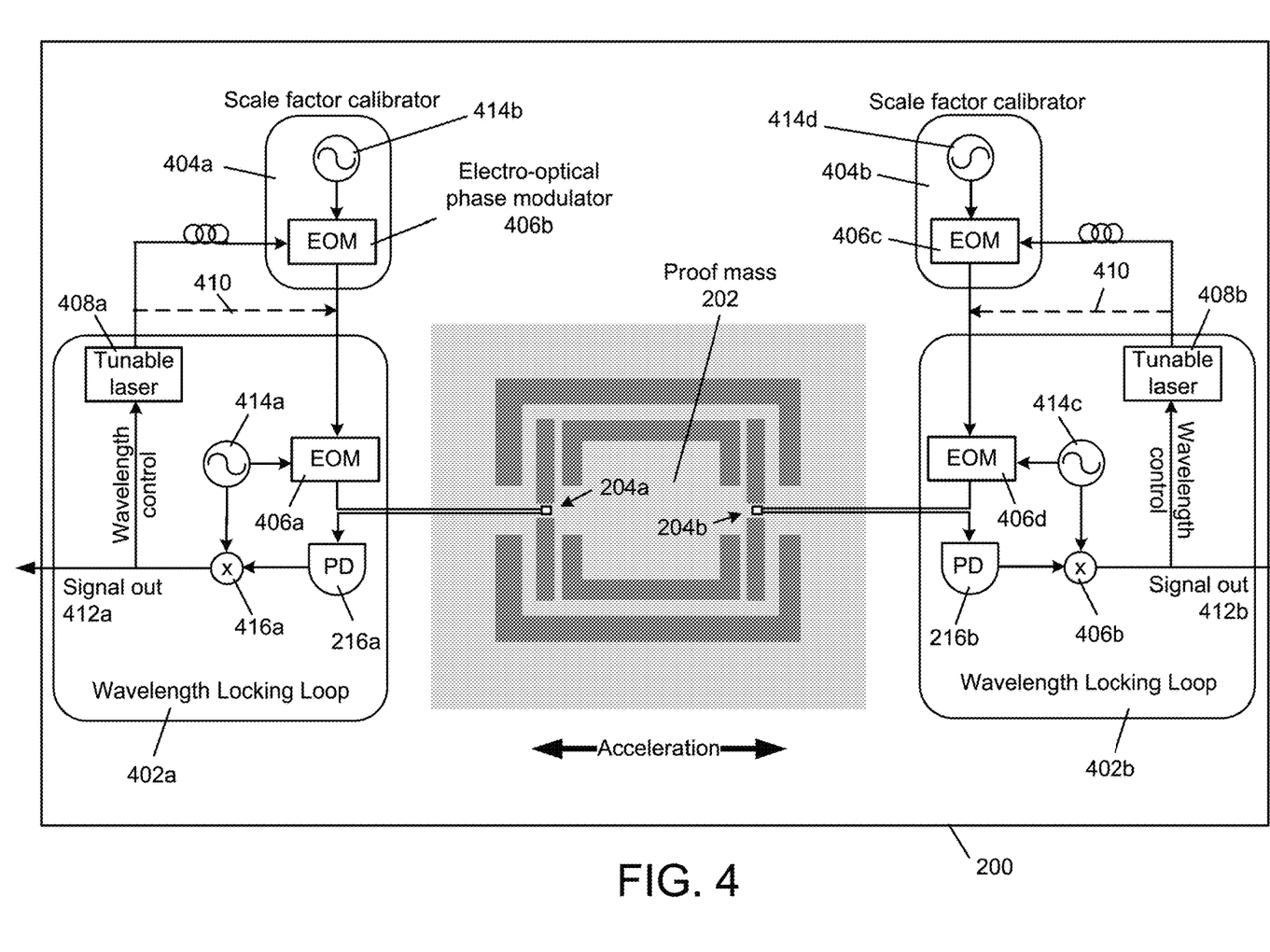
FIG. 4 illustrates an example embodiment of a wavelength locking circuit according to the invention.

A Pound-Drever-Hall (PDH) feedback loop is a specific type of wavelength locking circuit, which may be implemented using electro-optic phase modulators, photodiodes, and standard radio-frequency (RF) electronics. An example embodiment of such a feedback loop 402a, 402b is shown in FIG. 4, one associated with each sensing tether 204a, 204b, respectively. It should be understood that the PDH feedback loops 402a, 402b, shown in FIG. 4, are simplified depictions, and that one skilled in the art would understand that certain components, which are not shown for the sake of brevity, would be required to implement the PDH feedback loop.

Referring to the wavelength locking loop 402a, the electro-optical modulator (EOM) 406a together with the reference oscillator 414a dithers the light energy from the tunable laser 408a (or the scale factor calibrator 404a) across a range of wavelengths. The mixer 416a, together with the reference oscillator 414a, removes the dithering from the signal generated by the photodiode 418a to produce signal out 412a. The tunable laser 408a uses signal out 412a to adjust the wavelength of the light that the tunable laser 408a produces. The wavelength locking loop 402a operates to maintain the light energy produced by the tunable laser 408a at or near the resonant frequency of the ring resonator (i.e., at the bottom of the notch). The frequency to which the laser is controlled indicates the resonant frequency, and thus the strain of the resonator on the tether. Operation of the wavelength locking loop 402b is substantially the same as described with respect to wavelength locking loop 402a.

Embodiments may include scale factor calibrators 404a, 404b, shown in FIG. 4, to stabilize the scale factor associated with each sensing tether of the photonic accelerometer 200. Scale factor stability, or the ability to maintain constant acceleration sensitivity, can be obtained by including an electro-optic modulator (EOM) 406b to phase modulate the input light from a tunable laser 408. This provides a calibrated signal dictated solely by the frequency of modulation, which can be very accurately controlled. In the example embodiment of FIG. 4, a dashed line 410 shows the signal path from the tunable laser 408 during normal accelerometer operation, without the use of the scale factor calibrator 404.

Referring to scale factor calibrator 404a, the EOM 406b together with the reference oscillator 414b dithers the light energy from the tunable laser 408a across a range of wavelengths. Doing so causes the wavelength of the light energy to fall across different portions of the resonant notch of the ring resonator described with reference to FIG. 2C, thus facilitating characterization of the slope and depth of the notch. Operation of the scale factor calibrator 404b is substantially the same as described with respect to scale factor calibrator 404a.

Example embodiments may include a wavelength loop 402a and a scale factor calibrator 404a associated with a sensing tether 204a, and each wavelength loop 402a producing a signal out 412a.

Figure 5:
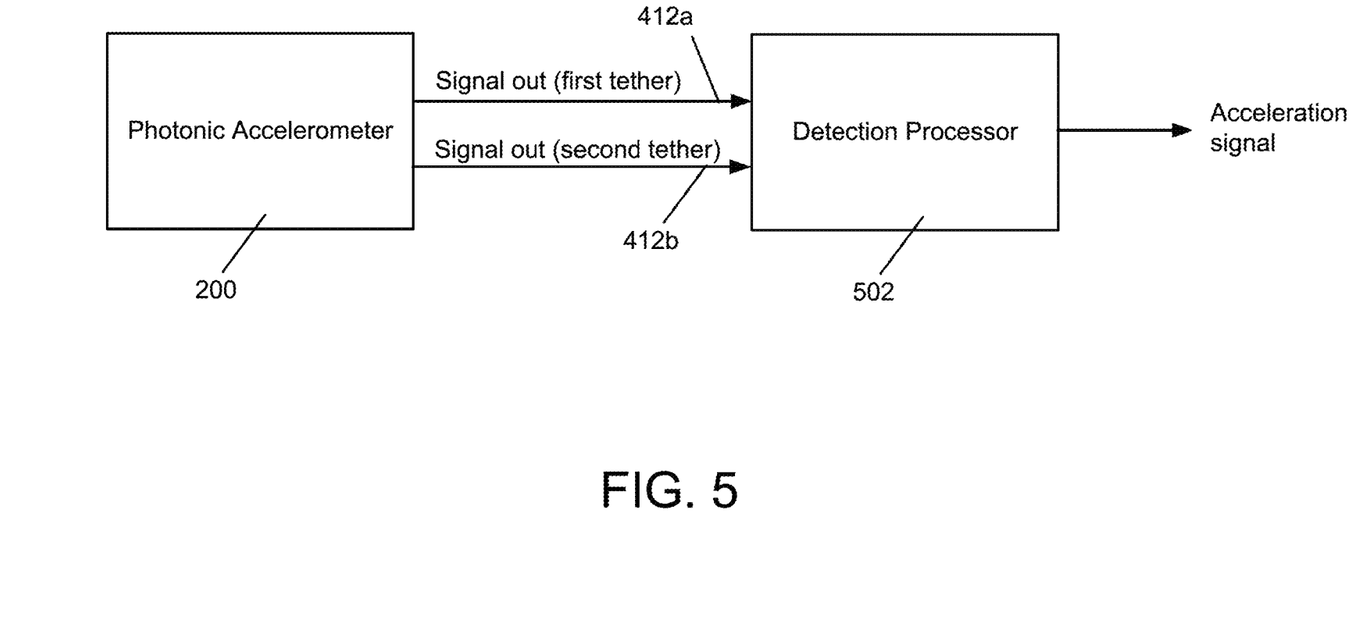
FIG. 5 shows an example embodiment of a photonic accelerometer, as described herein with respect to FIGS. 2A through 4, in cooperation with a detection processor.

FIG. 5 shows an example embodiment of a photonic accelerometer 200, as described herein with respect to FIGS. 2A through 4, in cooperation with a detection processor 502. The detection processor 502 receives a signal out 412a associated with the first sensing tether of the photonic accelerometer 200 and a signal out 412b associated with the second sensing tether of the photonic accelerometer 200. The detection processor 502 evaluates the signals 412a, 412b, to generate an acceleration signal 504 based on the signals 412a, 412b. Embodiments may implement the detection processor with a state machine comprising logical components, a processing system comprising a processor executing instruction code stored in memory, or other processing systems know in the art.

Figure 6:
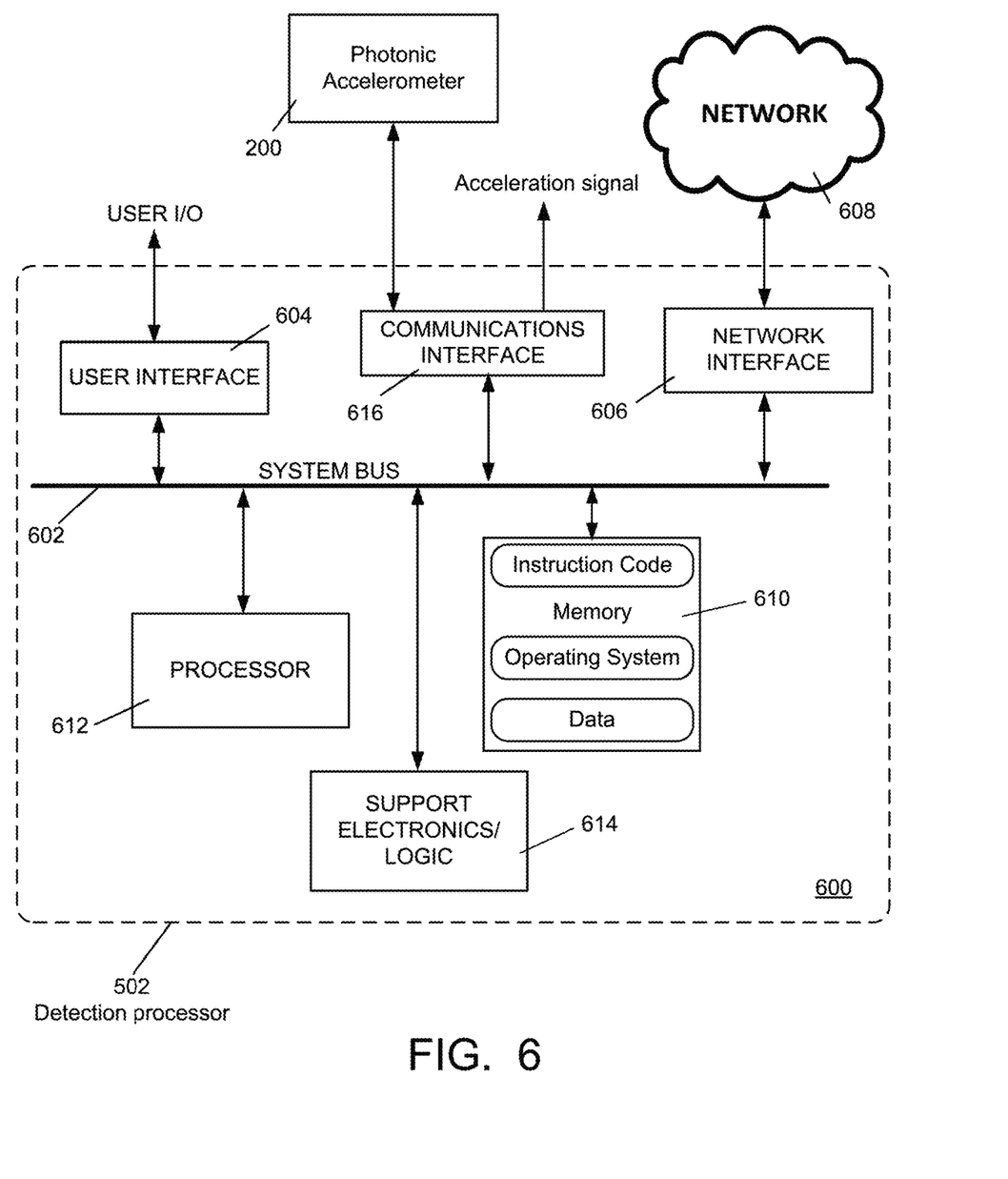
FIG. 6 shows an example internal structure of a processing system that may be used to implement one or more of the described embodiments.

FIG. 6 is a diagram of an example internal structure of a processing system 600 that may be used to implement one or more of the embodiments herein. Each processing system 600 contains a system bus 602, where a bus is a set of hardware lines used for data transfer among the components of a computer or processing system. The system bus 602 is essentially a shared conduit that connects different components of a processing system (e.g., processor, disk storage, memory, input/output ports, network ports, etc.) that enables the transfer of information between the components.

Attached to the system bus 602 is a user I/O device interface 604 for connecting various input and output devices (e.g., keyboard, mouse, displays, printers, speakers, etc.) to the processing system 600. A network interface 606 allows the computer to connect to various other devices attached to a network 608. Memory 610 provides volatile and non-volatile storage for information such as computer software instructions used to implement one or more of the embodiments of the present invention described herein, for data generated internally and for data received from sources external to the processing system 600.

A central processor unit 612 is also attached to the system bus 602 and provides for the execution of computer instructions stored in memory 610. The system may also include support electronics/logic 614, and a communications interface 616. The communications interface may receive the signals 412a and 412b from the photonic accelerometer 200, as described herein with reference to FIGS. 2A through 5.

In one embodiment, the information stored in memory 610 may comprise a computer program product, such that the memory 610 may comprise a non-transitory computer-readable medium (e.g., a removable storage medium such as one or more DVD-ROM's, CD-ROM's, diskettes, tapes, etc.) that provides at least a portion of the software instructions for the invention system. The computer program product can be installed by any suitable software installation procedure, as is well known in the art. In another embodiment, at least a portion of the software instructions may also be downloaded over a cable communication and/or wireless connection.

Figure 7:
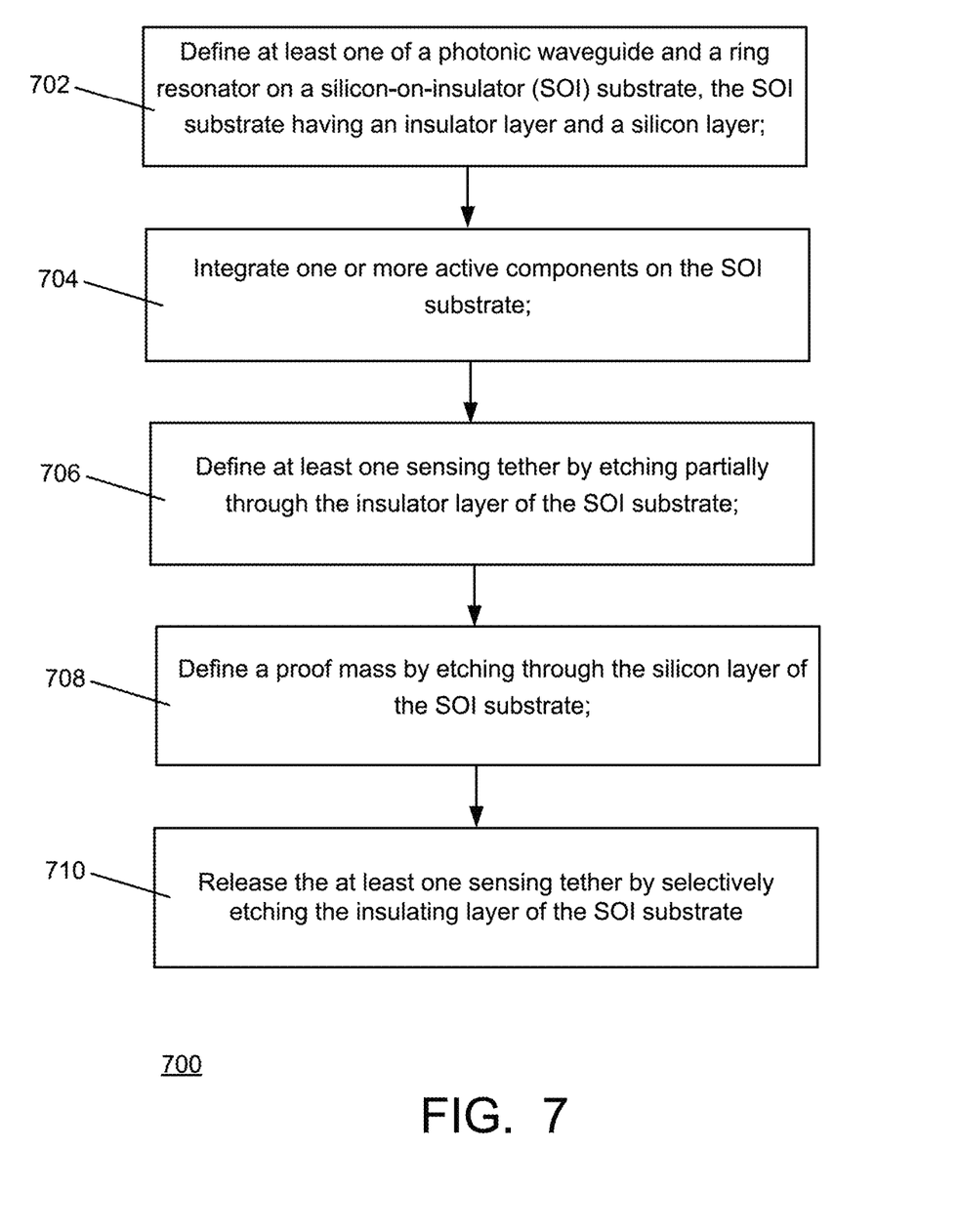
FIG. 7 shows an embodiment of a method 700 of fabricating an accelerometer according to the invention.

FIG. 7 shows an embodiment of a method 700 of fabricating an accelerometer according to the invention. The process begins by defining 702 at least one of a photonic waveguide and a ring resonator on a silicon-on-insulator (SOI) substrate, the SOI substrate having an insulator layer and a silicon layer. The ring resonator is formed in the region that will ultimately be etched to form the sensing tether. The method further comprises integrating 704 one or more active components on the SOI substrate, and defining 706 at least one sensing tether by etching partially through the insulator layer of the SOI substrate. The process further comprises defining 708 a proof mass by etching through the silicon layer of the SOI substrate, and releasing 710 the at least one sensing tether by selectively etching the insulating layer of the SOI substrate.

One significant attribute of the photonic accelerometer of the described embodiments is that the sensing element (the ring resonator of the example embodiment) directly experiences the strain induced by the acceleration of the proof mass. This attribute is due to the fact that the sensing element is integrated on the tether that connects the proof mass to an anchor point.

Another significant attribute of the photonic accelerometer of the described embodiments is that the photonic accelerometer may be implemented in a fully integrated, chip-scale manner by integrating the proof mass, silicon waveguides, and all of the optoelectronic components such as lasers, electro-optic phase shifters, and photodetectors onto the same silicon photonic platform. This allows for the passive sensor as well as the optoelectronic circuit used for stability control to be constructed in a monolithically integrated device. In other embodiments, the detection processor, which receives and evaluates the signals from the photodiodes to produce an acceleration value corresponding to the acceleration experienced by the proof mass, may also be integrated onto the same platform via wafer-level three-dimensional (3D) bonding of CMOS electronics to photonics wafers.

Photonic integrated resonant accelerometers according to the described embodiments facilitate improvements in many device parameters with respect to conventional MEMS devices. Such parameters include sensitivity, scale factor stability, bias stability, dynamic range, and bandwidth, among others. Many of these limitations stem from the electro-static transduction technique used by conventional accelerometer devices, as described herein. The novel optical system of the described embodiments overcomes these limitations, while still providing a chip-scale system that can be batch-fabricated and maintain low size, weight, power, and cost. The potential applications for this technology have a broad range from industrial sensors to inertial navigation, or any application where the robustness and sensitivity of current accelerometers needs to be improved.

It will be apparent that one or more embodiments described herein may be implemented in many different forms of software and hardware. Software code and/or specialized hardware used to implement embodiments described herein is not limiting of the embodiments of the invention described herein. Thus, the operation and behavior of embodiments are described without reference to specific software code and/or specialized hardware—it being understood that one would be able to design software and/or hardware to implement the embodiments based on the description herein.

Further, certain embodiments of the example embodiments described herein may be implemented as logic that performs one or more functions. This logic may be hardware-based, software-based, or a combination of hardware-based and software-based. Some or all of the logic may be stored on one or more tangible, non-transitory, computer-readable storage media and may include computer-executable instructions that may be executed by a controller or processor. The computer-executable instructions may include instructions that implement one or more embodiments of the invention. The tangible, non-transitory, computer-readable storage media may be volatile or non-volatile and may include, for example, flash memories, dynamic memories, removable disks, and non-removable disks.

While example embodiments have been particularly shown and described, it will be understood by those skilled in the art that various changes in form and details may be made therein without departing from the scope of the embodiments encompassed by the appended claims.

What is claimed is:

1. An accelerometer, comprising:
   a proof mass;
   a first tether, mechanically coupled to a first side of the proof mass and mechanically coupled to a first anchor site; and
   a first photonic ring resonator formed on the first tether to form a first sensing tether, such that the first photonic ring resonator undergoes strain along with the first tether;
   the first photonic ring resonator and the first tether configured such that a strain sustained by the first sensing tether causes a change of a first resonance condition of the first photonic ring resonator.

2. The accelerometer of claim 1, further comprising an excitation and detection system, operably coupled to the first photonic ring resonator, to sense the resonance condition of the first photonic ring resonator and to produce a first detection signal corresponding to the resonance condition of the first photonic ring resonator.

3. The accelerometer of claim 2, wherein the excitation and detection system comprises at least a laser, a first waveguide configured to convey light energy from the laser to the photonic ring resonator, a photodiode, and a second waveguide configured to convey light energy from the photonic ring resonator to the photodiode.

4. The accelerometer of claim 3, wherein the excitation and detection system further comprises a wavelength locking loop configured to adaptively maintain a center frequency of the light energy substantially at a resonant frequency of the first photonic ring resonator.

5. The accelerometer of claim 4, wherein the wavelength locking loop is a Pound-Drever-Hall feedback loop.

6. The accelerometer of claim 3, wherein the excitation and detection system further comprises a scale factor calibrator configured to stabilize a scale factor associated with the accelerometer.

7. The accelerometer of claim 2, wherein the excitation and detection system is integrated on a monolithic platform along with the proof mass and the sensing tether.

8. The accelerometer of claim 1, wherein cross-sectional dimensions, W×L, of the first sensing tether are at least one of W<5μ and L<5μ.

9. The accelerometer of claim 1, wherein the proof mass comprises a full thickness of a bulk silicon wafer upon which the accelerometer is fabricated.

10. The accelerometer of claim 1, wherein the first tether comprises silicon dioxide.

11. The accelerometer of claim 3, further comprising:
a second tether, mechanically coupled to a second side of the proof mass and mechanically coupled to a second anchor site, the second side being an opposing side of the proof mass with respect to the first side;
a second photonic ring resonator formed on the second tether to form a second sensing tether, the second photonic ring resonator and the second tether configured such that a strain sustained by the second sensing tether causes a change of a second resonance condition of the second photonic ring resonator;
the excitation and detection system further operably coupled to the second photonic ring resonator, configured to convey light energy from the laser to the second photonic ring resonator, to sense the resonance condition of the second photonic ring resonator, and to produce a second detection signal corresponding to the resonance condition of the second photonic ring resonator.

12. The accelerometer of claim 11, further comprising:
a detection processor configured to receive the first detection signal and the second detection signal, and produce an acceleration signal therefrom;
the acceleration signal corresponding to an amount of change of the resonance condition of the first photonic ring resonator and an amount of change of the resonance condition of the second photonic ring resonator, with respect to a reference resonance condition; and
the detection processor further configured to cancel an effect of thermal drift as a function of opposing detection signals produced by the first photonic ring resonator and the second photonic ring resonator.

13. The accelerometer of claim 2, further comprising a detection processor configured to receive the detection signal and produce an acceleration signal therefrom, the acceleration signal corresponding to an amount of change of the resonance condition with respect to a reference resonance condition.

14. An accelerometer, comprising:
a proof mass;
a first tether, mechanically coupled to a first side of the proof mass and mechanically coupled to a first anchor site; and
a first photonic ring resonator integrated with the first tether to form a first sensing tether, the first photonic ring resonator and the first tether configured such that a strain sustained by the first sensing tether causes a change of a first resonance condition of the first photonic ring resonator;
a wavelength locking loop configured to adaptively maintain a center frequency of light energy, propagating in the first photonic ring resonator, substantially at a resonant frequency of the first photonic ring resonator, and to produce a detection signal that corresponds to the resonant frequency of the first photonic ring resonator;
a scale factor calibrator configured to stabilize a scale factor associated with the accelerometer.

15. The accelerometer of claim 14, further comprising a detection processor configured to receive the detection signal and produce an acceleration signal therefrom, the acceleration signal corresponding to an amount of change of the resonance condition with respect to a reference resonance condition.

16. The accelerometer of claim 14, wherein cross-sectional dimensions, W×L, of the sensing tether are at least one of W<5μ and L<5μ.

17. The accelerometer of claim 14, wherein the wavelength locking loop is a Pound-Drever-Hall feedback loop.

18. The accelerometer of claim 14, further comprising:
a second tether, mechanically coupled to a second side of the proof mass and mechanically coupled to a second anchor site, the second side being an opposing side of the proof mass with respect to the first side;
a second photonic ring resonator integrated with the second tether to form a second sensing tether;
the second sensing element and the second tether configured such that a strain sustained by the second sensing tether causes a change of a second resonance condition of the second photonic ring resonator.

19. The accelerometer of claim 14, further comprising an excitation and detection system, operably coupled to the first photonic ring resonator, to sense the resonance condition of the first photonic ring resonator and to produce a detection signal corresponding to the resonance condition of the first photonic ring resonator, the excitation and detection system comprising at least a laser, a first waveguide configured to convey light energy from the laser to the photonic ring resonator, a photodiode, and a second waveguide configured to convey light energy from the photonic ring resonator to the photodiode.

* * * * *